(12) United States Patent
Katsumata

(10) Patent No.: US 6,826,016 B2
(45) Date of Patent: Nov. 30, 2004

(54) HEAD SUSPENSION ASSEMBLY AND MAGNETIC DISK APPARATUS COMPRISING THE HEAD SUSPENSION ASSEMBLY

(75) Inventor: Makoto Katsumata, Tachikawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 665 days.

(21) Appl. No.: 09/808,424

(22) Filed: Mar. 15, 2001

(65) Prior Publication Data

US 2001/0030836 A1 Oct. 18, 2001

(30) Foreign Application Priority Data

Mar. 24, 2000 (JP) ........................................ 2000-085424

(51) Int. Cl.[7] .............................. G11B 5/48; G11B 21/16
(52) U.S. Cl. ................................................. 360/245.9
(58) Field of Search .......................... 360/245.8, 245.9, 360/244.1

(56) References Cited

U.S. PATENT DOCUMENTS

| | | | | |
|---|---|---|---|---|
| 4,620,249 A | | 10/1986 | Suzaki et al. ............. 360/99.02 |
| 4,823,217 A | * | 4/1989 | Kato et al. ............... 360/246.8 |
| 5,055,969 A | * | 10/1991 | Putnam ...................... 361/749 |
| 5,095,396 A | * | 3/1992 | Putnam et al. ........... 360/264.2 |
| 5,422,764 A | * | 6/1995 | McIlvanie ................ 360/97.01 |
| 5,541,788 A | | 7/1996 | Ishida et al. ............. 360/98.01 |
| 5,859,746 A | * | 1/1999 | Ishida et al. ............. 360/97.01 |
| 5,859,749 A | * | 1/1999 | Zarouri et al. ........... 360/245.9 |
| 5,995,322 A | * | 11/1999 | Yanagihara ............... 360/97.01 |
| 6,134,084 A | * | 10/2000 | Ohwe et al. ............. 360/244.1 |
| 6,268,980 B1 | * | 7/2001 | Shiraishi et al. .......... 360/234.5 |
| 6,377,411 B1 | * | 4/2002 | Katsumata et al. ........... 360/46 |
| 6,388,840 B1 | * | 5/2002 | Ohwe ....................... 360/244.1 |
| 6,396,665 B1 | * | 5/2002 | Asano ....................... 360/264.2 |

FOREIGN PATENT DOCUMENTS

| | | | |
|---|---|---|---|
| DE | 32 15 821 A1 | 11/1982 | |
| JP | 9-320224 | 12/1997 | |
| JP | 11191210 A | * 7/1999 | ........... G11B/05/60 |
| JP | 11213364 A | * 8/1999 | ........... G11B/05/60 |
| JP | 11-213365 | 8/1999 | |

OTHER PUBLICATIONS

JP 02236804 A, Patent Abstracts of Japan, vol. 14, No. 554, Dec. 10, 1990.

* cited by examiner

Primary Examiner—William Korzuch
Assistant Examiner—C R Magee
(74) Attorney, Agent, or Firm—Pillsbury Winthrop LLP

(57) ABSTRACT

A head actuator assembly comprises a plate-like suspension having a distal end portion mounting with a magnetic head, and a trace having a relay FPC attached to the suspension through a lining plate. A head IC is mounted on the relay FPC and positioned near the magnetic head. In an area which faces the head IC, insulation layers of the FPC are removed, and an opening is formed in the lining plate and suspension. A wiring pattern of the relay FPC is exposed through this opening.

5 Claims, 8 Drawing Sheets

HEAD SUSPENSION ASSEMBLY AND MAGNETIC DISK APPARATUS COMPRISING THE HEAD SUSPENSION ASSEMBLY

CROSS-REFERENCE TO RELATED APPLICATIONS

This application is based upon and claims the benefit of priority from the prior Japanese Patent Application No. 2000-085424, filed Mar. 24, 2000, the entire contents of which are incorporated herein by reference.

BACKGROUND OF THE INVENTION

The present invention relates to a head suspension assembly (hereinafter abbreviated as a HSA) and particularly to a HSA mounting a head IC together with a magnetic head, and a magnetic disk apparatus comprising the HSA.

In general, a magnetic disk apparatus comprises a magnetic disk, a spindle motor for supporting, rotating the magnetic disk, a carriage assembly for supporting and driving a magnetic head, a voice coil motor for driving the carriage assembly, and a main flexible printed circuit board (hereinafter called as a main FPC) for electrically connecting the magnetic head to a control section, which are arranged in a case.

The carriage assembly includes a bearing unit attached to the case, and a plurality of HSAs extending from the bearing unit. The magnetic head is mounted on the extended end portion of each HSA. This HSA has an arm made of a thin metal plate spring and having a proximal end portion which is supported on the bearing unit, an elongate suspension extending from the distal end of the arm and supporting the magnetic head on its distal end portion, and an elongate trace adhered on the suspension and arm. The magnetic head is connected to the main FPC through the trace. This trace is constructed by layering a relay flexible printed circuit board on a thin metal lined plate, for example, made of stainless or the like.

The main FPC has a connection end portion fixed on the bearing unit by a screw, and a proximal end portion connected to the control circuit board fixed to the case. Also, the main FPC has a plurality of connection pads provided at the connection end portion, and a plurality of wiring patterns extending from these connection pads to the proximal end portion. Further, the proximal end portion of the trace extending from the magnetic heads is soldered on the connection pads provided at the connection end portion of the main FPC. In this manner, the magnetic heads are electrically connected to the control circuit board and controlled by this control circuit board.

Meanwhile, the head IC (signal processing IC, integrated circuit element) which amplifies a signal read from the magnetic recording medium by the magnetic head is generally equipped on the control circuit board. In contrast, recently, the length of each wiring pattern from the magnetic head to the head IC can be shortened so that the inductances and capacitances of the wiring patterns can be reduced by mounting the head IC on the trace of the HSA near the magnetic head, as shown in Japanese Patent Application KOKAI Publication No. 11-213365, for example. In addition, a proposal has been made for a HSA equipped with a capacitor (capacitor element) for smoothening the power source.

If the head IC is thus equipped on the HSA, total five wiring patterns, i.e., two signal lines, two power lines (Vcc and Vee), and one ground line (GND) are formed on the trace.

Meanwhile, in the main FPC connected with the trace, independent five wiring patterns are provided in correspondence with one trace. Therefore, for example, the main FPC in a magnetic disk apparatus comprising four HSAs has twenty independent wiring patterns and two wiring patterns for VCM, so that the entire width of the main FPC becomes large. Further, this main FPC constructs a movable part which shifts in accordance with rotation of the head actuator. Therefore, if the width is increased, the main FPC undesirably causes a resistance when the head actuator moves.

Also, the FPC forming part of the trace has a structure in which wiring patterns made of copper foil are sandwiched between insulation layers made of polyimide or the like. Further, the wiring patterns of the FPC which is electrically connected with the head IC are covered with insulation layers, a lining plate having a low heat conductivity, and a suspension, so that only poor heat radiation is attained. Therefore, it is difficult to radiate efficiently heat generated from the head IC, and the temperature of the head IC may exceed a guaranteed temperature range. Further, heat from the head IC transfers to the magnetic head so that the characteristics of the magnetic head change, and the lining plate of the trace and the suspension may thermally expand thereby changing the characteristics of the entire HSA.

In addition, if circuits in the head IC that generate heat of high calorie are not provided symmetrically in the right and left sides with respect to the center line of the HSA, thermal expansion is not symmetrical between the left and right sides in the part which supports the magnetic head of the suspension. Consequently, the characteristics of the magnetic head may be deteriorated.

If the head IC and the capacitor are installed on the HSA, the capacitor cannot be thinned more than the head IC because of its structure, and therefore, the capacitor may contact the magnetic disk surface when the magnetic disk apparatus receives an impact or the like and is deformed thereby.

BRIEF SUMMARY OF THE INVENTION

The present invention has been made in view of the above circumstances, and has an object of providing a head suspension assembly capable of reducing influences from heat of the head IC and maintaining excellent characteristics and a magnetic disk apparatus comprising the head suspension assembly.

The present invention has another object of providing a head suspension assembly on which a capacitor can be installed without damaging the magnetic disk and a magnetic disk apparatus comprising the same.

The present invention further has another object of providing a magnetic disk apparatus capable of reducing the number of wiring lines of the main FPC and of reducing thereby the entire width.

To achieve the above objects, a head suspension assembly according to the present invention comprises: a suspension having a distal end portion on which a magnetic head is mounted; a flexible printed circuit board arranged on the suspension with a lining plate interposed therebetween; and a head IC mounted on the flexible printed circuit board and positioned near the magnetic head. The flexible printed circuit board includes a first wiring pattern which electrically connects the magnetic head with the head IC, a second wiring pattern which extends from the head IC to a proximal end portion of the suspension, and insulation films which cover the first and second wiring patterns from both sides, and the insulation films are removed from an area which faces the head IC, and the lining plate and the suspension has an opening in the area which faces the head IC such that the first and second wiring patterns are exposed through the opening.

Also, according to another head suspension assembly of the present invention, the flexible printed circuit board includes a first wiring pattern which electrically connects the magnetic head with the head IC, a second wiring pattern which extends from the head IC to a base end side of the suspension, and insulation films which cover the wiring patterns from both sides. The insulation films are removed from an area which faces the head IC, and the lining plate and the suspension has an opening at the area which faces the head IC. A heat radiation member is provided in the opening, kept in contact with the wiring patterns.

Further, another head suspension assembly according to the present invention comprises: a suspension having a distal end portion on which a magnetic head is mounted; a flexible printed circuit board installed on the suspension with a lining plate interposed therebetween; a head IC mounted on the flexible printed circuit board and positioned near the magnetic head; and a heat radiation member covering an outer surface of the head IC.

According to the head actuator assemblies having the above mentioned construction, the heat radiation efficiency of the head IC is improved so that temperature increase exceeding a guaranteed temperature range of the head IC, characteristic changes of the magnetic head, and deterioration of mechanical characteristics of the suspension due to heat can be prevented.

Also, according to another head actuator assembly of the present invention, the suspension and the lining plate are welded to each other at a welding point positioned between the slider and the head IC. Further, the trace is formed at the lining plate and has an opening positioned between the welding point and the head IC.

In the structure as described above, heat from the head IC can be transmitted to the suspension through the welding point, and heat is hindered from transferring to the magnetic head by providing an opening. In this manner, temperature increase exceeding the guaranteed temperature range of the head IC, characteristic changes of the magnetic head, and deterioration of mechanical characteristics of the suspension due to head can be prevented.

Further, according to another head suspension assembly of the present invention, the head IC has a write driver circuit and a bias current circuit which are each arranged symmetrically with respect to a center axis of the suspension.

In the structure as described above, stable operation can be assured steadily without breaking the balance of the suspension even if the suspension is thermally expanded due to head from the head IC.

Another head suspension assembly according to the present invention comprises: a suspension having a distal end portion on which a magnetic head is mounting; a flexible printed circuit board installed on the suspension with a lining plate interposed therebetween; a head IC mounted on the flexible printed circuit board and positioned near the magnetic head; and a capacitor mounted on the flexible printed circuit board between the magnetic head and the head IC and arranged closer to the distal end side of the suspension than the head IC.

With the structure as described above, the capacitor which has a greater height than the head IC is provided closer to the magnetic head than the head IC, i.e., closer to the distal end side of the suspension. As a result, height margins increase with respect to the magnetic disks, so that damages on the head suspension assembly and the magnetic disks can be reduced.

Meanwhile, a magnetic disk apparatus according to the present invention is constructed by comprising any one of the head suspension assemblies described above.

Another magnetic disk apparatus according to the present invention comprises: a magnetic disk; a plurality of magnetic heads for recoding/reproducing of information with respect to the magnetic disk; a carriage assembly supporting the magnetic heads movably with respect to the magnetic disk, the carriage assembly including a bearing unit, and a plurality of head suspension assemblies each which has a proximal end portion supported by the bearing unit and a distal end portion on which one of the magnetic heads is mounted; and a main flexible printed circuit board having a connection end portion attached to the carriage assembly, and a proximal end portion positioned apart from the connection end portion.

Each of the head suspension assemblies includes an arm extending from the bearing unit, a suspension projecting from an extended end of the arm, an elongate relay flexible printed circuit board provided on the arm and the suspension and having a distal end portion connected to the magnetic head and a proximal end portion connected to the connection end portion of the main flexible printed circuit board, and a head IC mounted on the relay flexible printed circuit board near the magnetic head.

The relay flexible printed circuit board includes a signal line, a power source line, and a ground line extending from the magnetic head to the proximal end portion through the head IC, the main flexible printed circuit board includes a plurality of sets of connection pads, in correspondence with the plurality of head suspension assemblies, the connection pads of each set includes first, second and third connection pads respectively connected with the signal line, power source line and ground line of the relay flexible printed circuit board, and the main flexible printed circuit board includes a connection line which connects the plurality of third pads with each other, a ground line extending from one of the third connection pads to the proximal end portion, and a plurality of signal lines extending respectively from the first and second connection pads to the proximal end portion.

With the magnetic disk apparatus having the structure described above, the number of conductive lines in the main flexible printed circuit board can be reduced so that the entire width can be reduced. In this manner, the main flexible printed circuit board can be smoothly deformed, following the operation of the carriage assembly, and the resistance applied to the carriage assembly can be reduced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

There will now be described an embodiment which applies the present invention to a hard disk drive (hereinafter called a HDD) with reference to the accompanying drawings.

Figure 1:
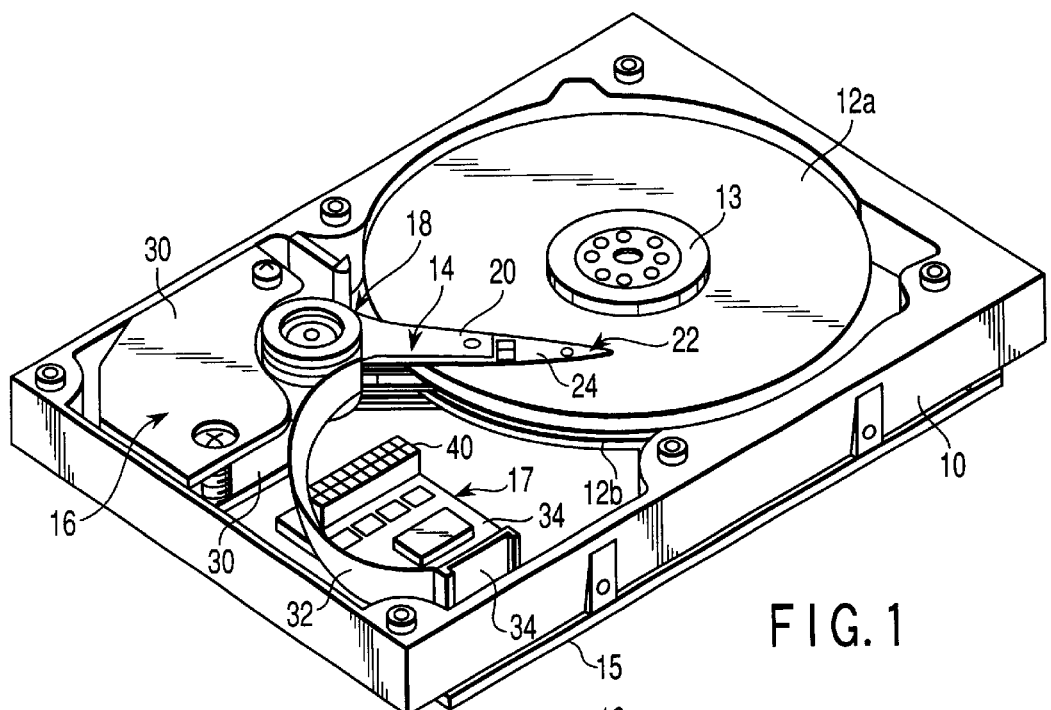
FIG. 1 is a perspective view showing the inside of a HDD according to the first embodiment of the present invention.

As shown in FIG. 1, the HDD has a rectangular box-like case 10, and a top cover not shown, which is fixed to the case by a plurality of screws thereby closing a top opening of the case.

In the case 10 are arranged two magnetic disks 12a and 12b serving as magnetic recording media, a spindle motor 13 for supporting and rotating these magnetic disks, a plurality of magnetic heads for recording and reproducing information on and from the magnetic disks, a carriage assembly 14 which supports movably these magnetic heads with respect to the magnetic disks 12a and 12b, a voice coil motor (hereinafter called VCM) for rotating and positioning the carriage assembly 16, and a board unit 17 equipped with circuit parts such as control ICs and the like.

A printed circuit board 15 for controlling the operation of the spindle motor 13, VCM 16, and the magnetic heads through the board unit 17 is fixed to the outer surface of the case 10 by screws and is opposite to the bottom wall of the case.

Each of the magnetic disks 12a and 12b has a diameter of 65 mm (2.5 inches) and magnetic recording layers on its upper and lower surfaces. The two magnetic disks 12a and 12b are engaged coaxially with a hub not shown of the spindle motor 13, and are stacked with a predetermined interval in the axis direction of the hub. Further, the magnetic disks 12a and 12b are rotated at a predetermined speed by the spindle motor 13.

Figure 2:
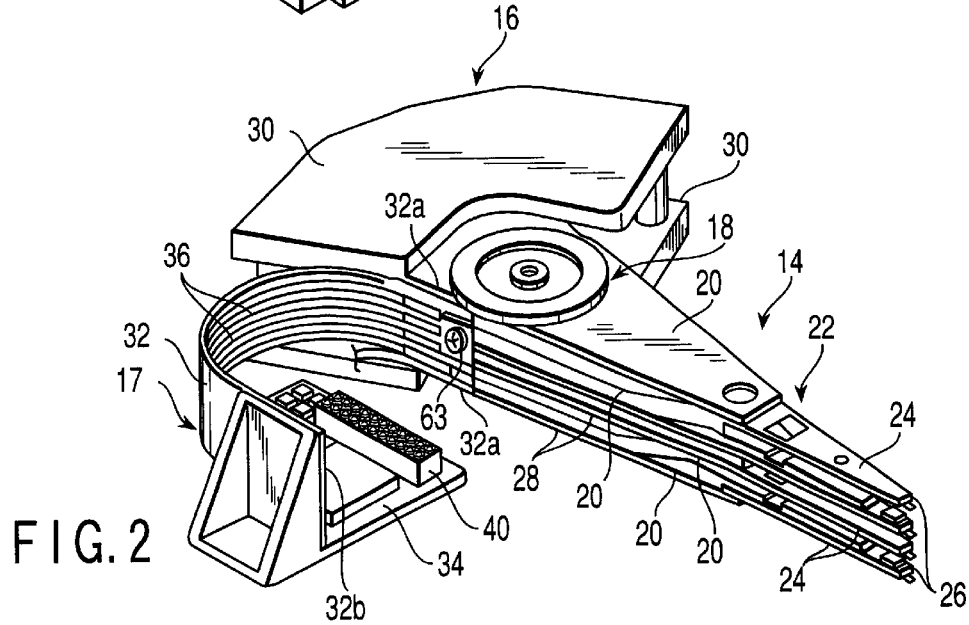
FIG. 2 is a perspective view showing a carriage assembly and a board unit of the HDD.

As shown in FIGS. 1 and 2, the carriage assembly 14 comprises a bearing assembly 18 as a bearing unit fixed to the bottom wall of the case 10, and four elongate head suspension assemblies (hereinafter called HSAs) extending in parallel with each other from the bearing assembly 18.

Figure 3:
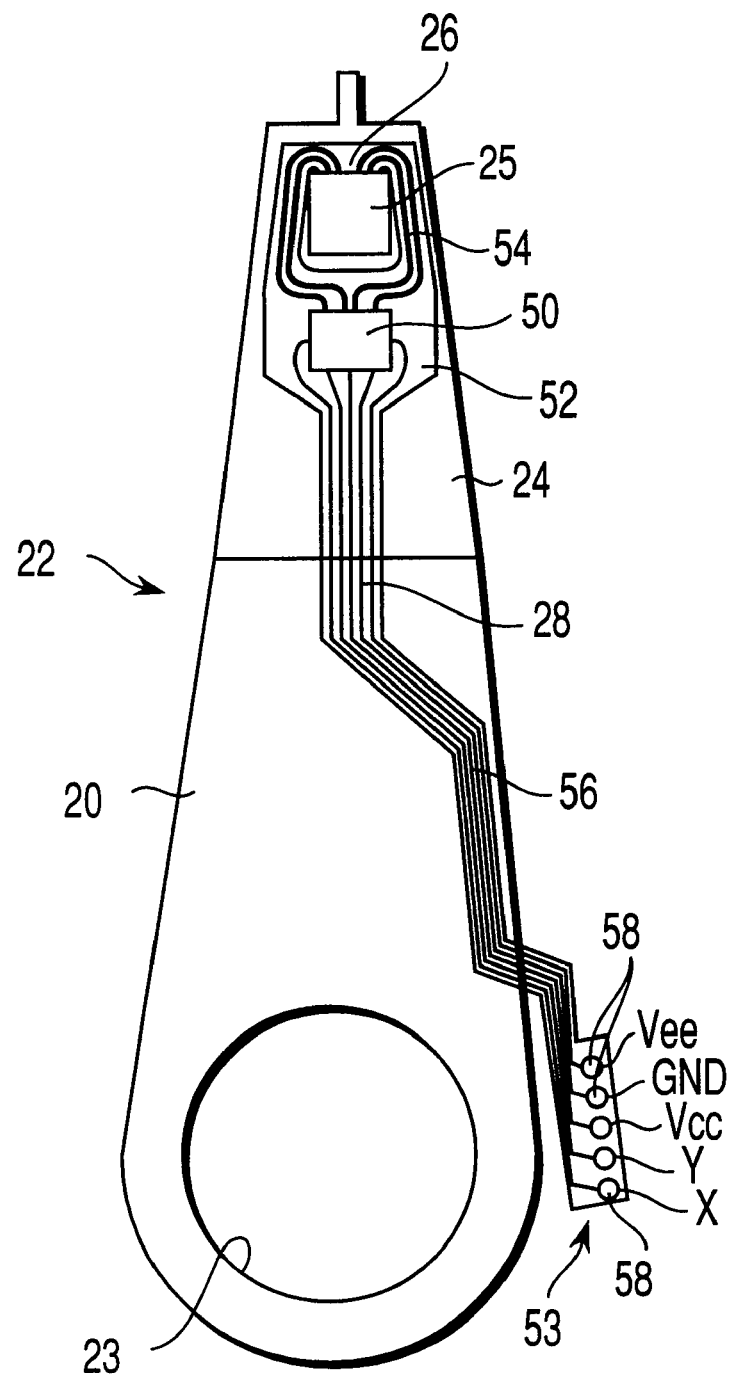
FIG. 3 is a plan view showing a HSA of the carriage assembly.

As shown in FIGS. 2 and 3, each HSA 22 comprises an arm 20, an elongate suspension 24 attached to the extended end of the arm, a magnetic head 26 fixed to the suspension, an elongate trace 28 adhered onto the arm and suspension and electrically connected to the magnetic head 26, and a head IC 50 mounted on the trace near the magnetic head.

The arm 20 is formed of, for example, stainless-based material such as SUS304 or the like, into a thin plate-like shape having a plate thickness of 250 μm. At the proximal end of the arm 20 is formed a circular through hole 23 into which the hub of the bearing assembly 18 is inserted. The suspension 24 is formed of an elongate leaf spring having a plate thickness of 60 to 70 μm. The suspension 24 has a proximal end fixed to the distal end of the arm 20 by spot welding or adhesion and extends from the arm. Note that the suspension 24 may be formed to be integral with the arm 20 from the same material as the arm 20.

The magnetic head 26 is constructed by a composite separation type magnetic head which is comprised of an MR element (magnetoresistive element) for reproduction (reading) and a thin film head for recording (writing). The magnetic head 26 is fixed to a rectangular slider 25 which is attached to a gimbal part provided at the distal end portion of the suspension 24. The slider 25 is applied with a pressure in the magnetic disk direction by the function of the suspension 24 as a leaf spring, and serves to fly up the magnetic head 26 by a substantially constant distance from the magnetic disk surface by means of air pressure caused by the rotation of the magnetic disk surface.

The trace 28 is constructed by layering a relay flexible printed circuit board (hereinafter called a relay FPC) 52 on a thin lining plate made of metal such as stainless steel or the like. This trace 28 is welded to the surfaces of the arm 20 and suspension 24 on the side of the lining plate and extends from the vicinity of the magnetic head 26 to the proximal end portion of the arm 20. The proximal end portion of the trace 28 extends to the outside of the arm and constructs an electrode pad section 53. The head IC 50 is mounted on the relay FPC 52 in the condition of a bear chip, and is located at the distal end portion of the suspension 24 to be adjacent to the magnetic head 25.

The relay FPC 52 of the trace 28 includes a first wiring pattern comprised of four conductive lines 54 which connect, for example, four electrodes of the magnetic head 26 with four bumps described later of the head IC 50, and a second wiring pattern comprised of five conductive lines 56 which connect, for example, the other remaining five bumps of the head IC with the electrode pad section 53. These conductive lines 56 are comprised of two signal lines X and Y, two power source lines Vee and Vcc, and a ground line GND. In addition, each of the first wiring pattern comprised of a group of conductive lines 54 and the second wiring pattern comprised of a group of conductive lines 56 are arranged in an symmetric layout with respect to the center line in the longitudinal direction of the suspension 24, at least on the suspension 24.

The electrode pad section 53 of the trace 28 has five electrode pads 58 conducted respectively to the conductive lines 56. These electrode pads 58 are arranged in line in the order of Vee, GND, Vcc, Y, and X from the side of the magnetic head 26.

As shown in FIGS. 1 and 2, the HSAs 22 are respectively attached to the bearing assembly 18 with the hub of the bearing assembly 18 inserted in the through hole 23, and extend in parallel with each other and in the same direction. In addition, the HSAs 22 are arranged such that every two of the magnetic heads 26 face each other.

The carriage assembly 14 has a support frame not shown but projecting from the bearing assembly 18 in the direction opposite in which the arms 20 extend, and a voice coil not shown but constructing a part of the VCM is fixed to the support frame.

In a state where the carriage assembly 14 is installed in the case 10, the magnetic disk 12*a* is positioned between two HSAs 22 on the upper side, and the magnetic disk 12*b* is positioned between two HSAs 22 on the lower side. Further, the four magnetic heads 26 supported by the HSAs 22 contact respectively the upper and lower surfaces of the magnetic disks 12*a* and 12*b*, and thus clamp the magnetic disks from both sides.

The voice coil fixed to the support frame of the carriage assembly 14 is positioned between a pair of yokes 30 fixed to the case 10. The voice coil, the yokes, and a magnet not shown but fixed to one of the yokes together construct the VCM 16. The carriage assembly 14 is rotated by electrically conducting the voice coil, so that the magnetic heads 26 are positioned on desired tracks on the magnetic disks 12*a* and 12*b*.

Figure 4:
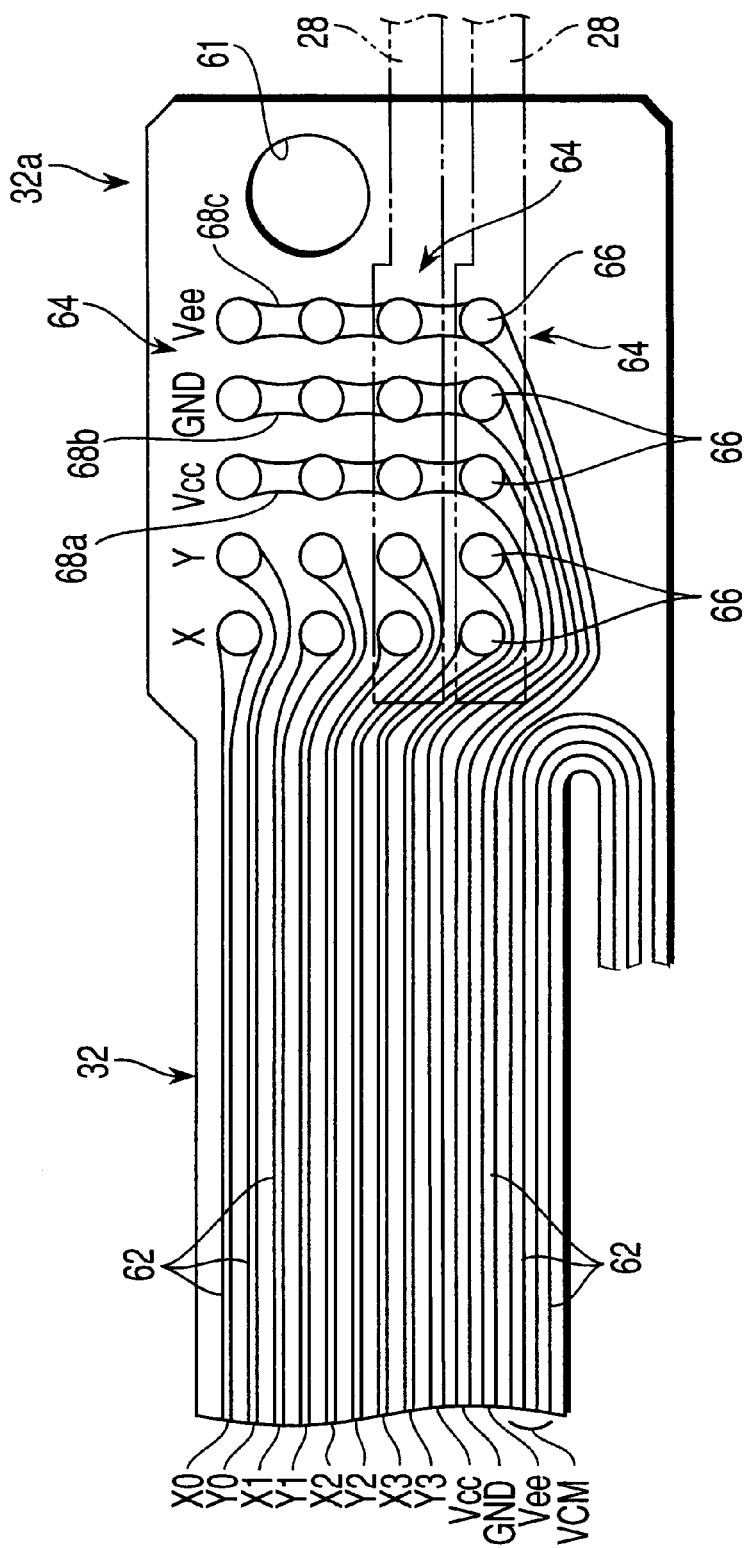
FIG. 4 is an enlarged plan view showing a part of a main FPC of the board unit.

Meanwhile, as shown in FIGS. 1, 2, and 4, the board unit 17 comprises a rectangular circuit board body 34 fixed to the bottom wall of the case 10, and an elongate main flexible printed circuit board (hereinafter called a main FPC) 32 extending from this circuit board body, and a plurality of electronic parts, a connector 40, and the like are mounted on the circuit board body 34. Further, as will be described later, the magnetic heads 26 of the HSAs 22 are electrically connected to the circuit board body 34 through the trace 28 and the main FPC 32.

The main FPC 32 is formed into a substantially band-like shape, and includes a connection end portion 32*a* attached to the bearing assembly 18 of the carriage assembly 14, and a proximal end portion 32*b* formed to be integral with the circuit board body 34. The connection end portion 32*a* has a through hole 61 and is fixed to the bearing assembly 18 by a screw 63 screwed in to the assembly 18 through the through hole. Note that a reinforcement plate not shown is adhered to the back surface of the connection end portion 32*a*.

The main FPC 32 has a wiring pattern comprised of a plurality of conductive lines 62 extending in parallel with each other in the longitudinal axis direction between the connection end portion 32*a* and the proximal end portion 32*b*. Four pairs of connection pad sections 64 are formed at the connection end portion 32*a* of the main FPC 32, in correspondence with the number of magnetic heads.

Each connection pad section 64 has five connection pads 66. These five connection pads 66 are arranged linearly in the longitudinal axis direction of the main FPC 32. In addition, the four sets of connection pad sections 64 are arranged in parallel with each other at a predetermined interval.

In the present embodiment, the connection pads 66 of each set respectively correspond to the electrode pads 58 provided on the traces 28 of the HSAs 22, and are disposed in line in the order of Vee, GND, Vcc, Y, and X from the distal end side of the connection end portion 32*a*. The connection pads 66 for Vcc of the connection pad section 64 are connected with each other through a connection line 68*a*. In addition, the connection pads 66 for GND of the connection pad section 64 are connected with each other through a connection line 68*b*, and further, the connection pads 66 for Vee are connected with each other through a connection line 68*c*.

The group of the conductive lines 62 of the main FPC 32 includes eight independent signal lines connected to the connection pads 66 for signals X and Y of each set, a common power source line connected to any one of the connection pads 66 for Vcc, e.g., the lowermost connection pad, a common GND line connected to any one of the connection pads 66 for GND, e.g., the lowermost connection pad, a common power source line connected to any one of the connection pads 66 for Vee, e.g., the lowermost connection pad, and further two power source lines connected to the voice coil of the VCM 16.

Further, five electrode pads 58 provided at the connection end portion 53 of the trace 28 of each HSA 22 are soldered to the respective five connection pads 66 of a corresponding set of the connection end portions 32*a* of the main FPC 32. In this manner, each magnetic head 26 is electrically connected to the circuit board body 34 through the head IC 50, the relay FPC 56 of the trace 28, and the main FPC 32, and this circuit board body 34 is electrically connected to the printed circuit board 15 through the connector 40.

According to the HDD constructed as described above, the connection pads 66 for Vcc of the main FPC 32, the connection pads 66 for GND thereof, and the connection pads 66 for Vee thereof are provided at the distal end portion of the main FPC, and are connected with each other through the connection lines 68*a*, 68*b*, and 68*c*. Therefore, these connection pads are connected to the circuit board body 34 through common conductive lines. Accordingly, the number of conductive lines 62 of the main FPC 32 can be reduced, and the width of the main FPC can thus be reduced. In this manner, the resistance of the main FPC 32 when the carriage assembly 14 operates can be reduced. In addition, in the connection end portion 32*a* of the main FPC 32, the number of lines which extend through spaces between connection pads 66 is reduced so that the line width of each line can be increased.

Figure 5:
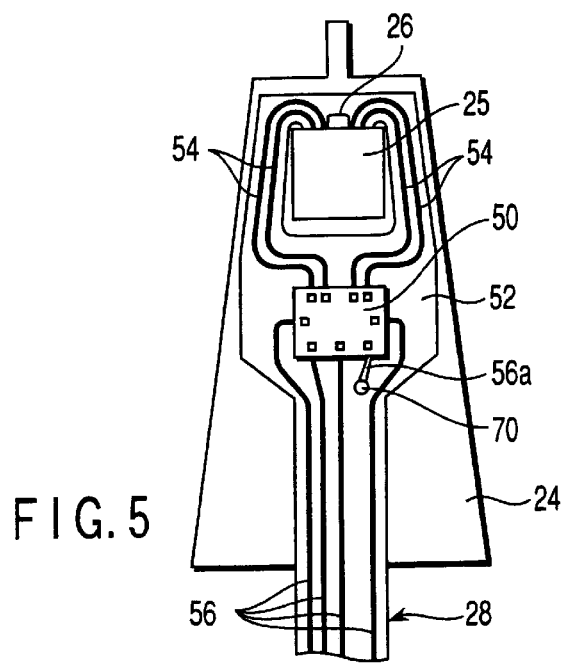
FIG. 5 is a plan view showing a HSA according to the second embodiment of the present invention.
Figure 6:
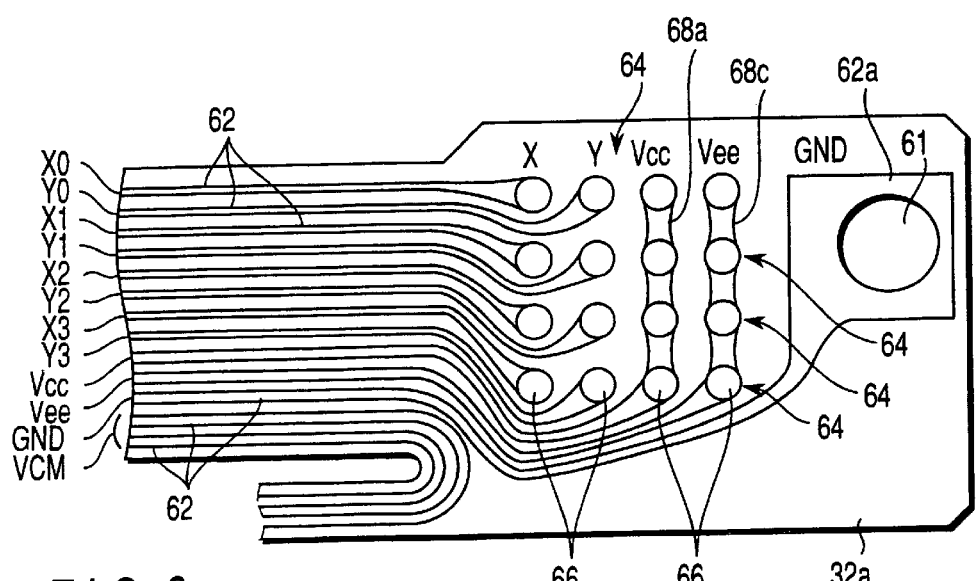
FIG. 6 is an enlarged plan view showing a part of a main FPC according to the second embodiment.

As shown in FIGS. 5 and 6, according to a HDD of a second embodiment of the present invention, the connection pads for GND are omitted from the connection end portion 32*a* of the main FPC 32. In place of the omitted pads, one of the conductive lines 62 extends to the through hole 61 and forms a conductive portion 62*a* around the through hole 61. This connection end portion 32*a* is fixed to the bearing assembly 18 by a screw 63 which is inserted in the through hole 61 and is electrically conductive.

In addition, the arm 20 and suspension 24 of each HSA 22 are made of material such as stainless steel that is electrically conductive. Further, each trace 28 has a hole 70 formed in the insulation film and the lining plate of the relay FPC 52, at the part which overlaps a conductive line 56*a* for GND connected to the head IC 50. The conductive line 56*a* is connected to the suspension 24 through the hole 70.

Thus, GND of the head IC 50 provided on each HSA is electrically connected to the conductive portion 62*a* of the main FPC 32 through the conductive line 56a for GND, suspension 24, arm 20, and the screw 63, and is electrically connected to the circuit board body 34 through the conductive line 62.

In this manner, the electrode pads for GND provided at the trace 28 of each HSA 22 and the connection pads for GND provided at the connection end portion 32a of the main FPC 32 can be omitted. Accordingly, soldering portions of the main FPC 32 and the HSA 22 can be reduced, so that assembling feasibility and reliability of the HDD can be improved. Further, heat of the head IC 50 can be easily transmitted to the suspension 24, thus heat radiation effect can be improved.

Figure 7:
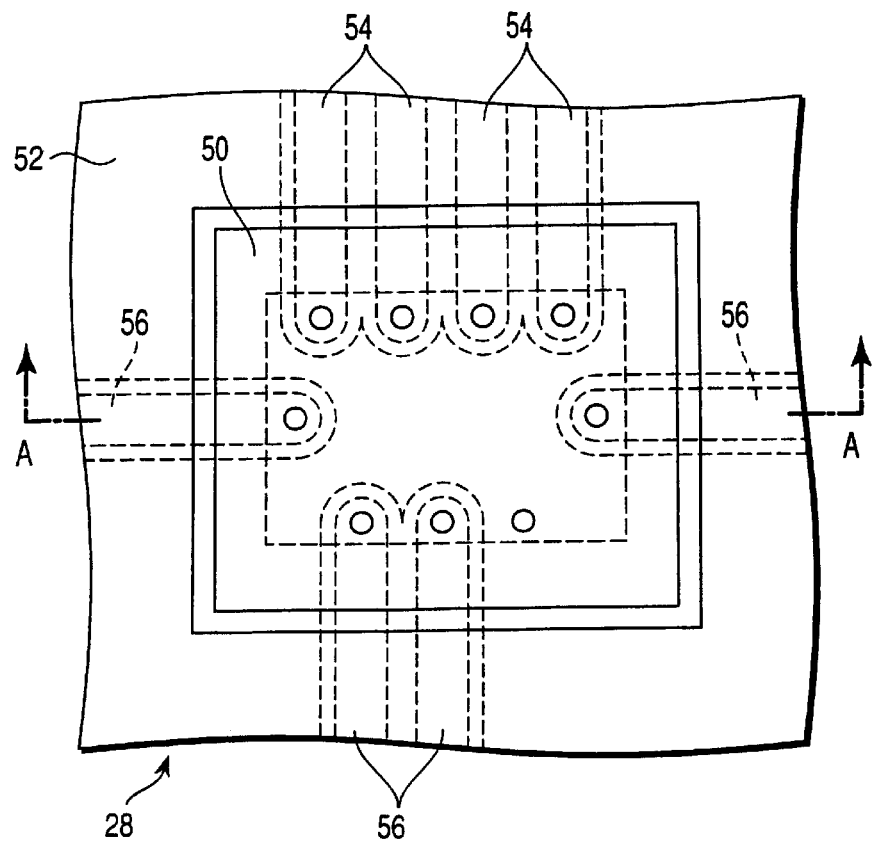
FIG. 7 is an enlarged plan view showing a part of a head IC part of a HSA according to the third embodiment of the present invention.
Figure 8:
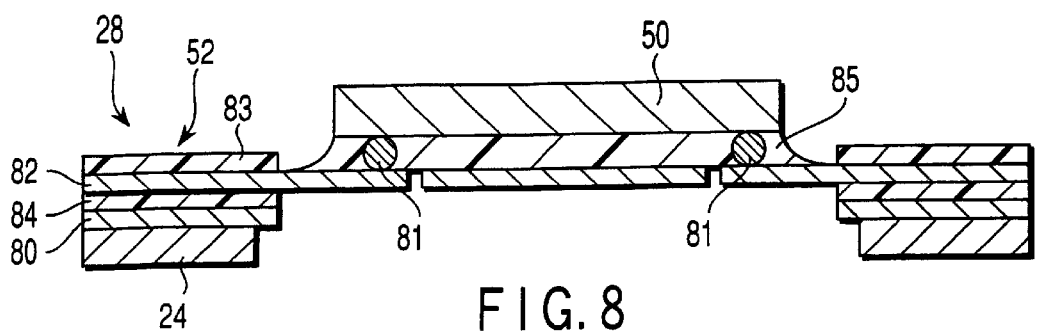
FIG. 8 is a cross-sectional view cut along a line VIII—VIII shown in FIG. 7.

FIGS. 7 and 8 show an essential part of a HDD according to a third embodiment of the present invention. The trace 28 of each HSA includes a lining plate 80 and a relay FPC 52 layered on the lining plate. The lining plate 80 is in contact with the suspension 24. The relay FPC 52 includes copper foil 82 forming conductive lines 54 and 56 which function as first and second wiring patterns, and upper and lower insulation films 83 and 84 made of polyimide which covers both surface sides of the copper foil.

According to the third embodiment, upper and lower insulation films 83 and 84 are removed from the part of each trace 28 where the head IC 50 is equipped, and the head IC is mounted on the copper foil 82 through soldering bumps 81. Under filler 85 is filled between the head IC 50 and the copper foil 82. In addition, an opening 86 is formed in those parts of the lining plate 80 and the suspension 24 that face the head IC 50.

In this manner, the copper foil 82 is exposed to the outside through the opening 86, at the part where the head IC 50 is equipped. Accordingly, heat generated from the head IC 50 can be radiated efficiently, so that it is possible to prevent temperature increase exceeding a guaranteed temperature range, characteristic changes of the magnetic head 26 due to the heat from the head IC 50, and deterioration of mechanical characteristics of the suspension 24.

Figure 9:
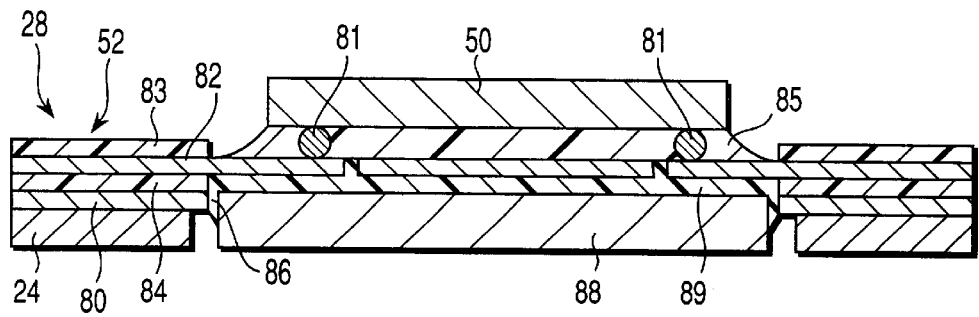
FIG. 9 is a cross-sectional view showing a head IC part of a HSA according to the fourth embodiment of the present invention.

According to a fourth embodiment of the present invention shown in FIG. 9, a heat radiation plate 88 made of material such as Cu, ceramics, or the like that has a high thermal conductivity is provided in the opening 86 formed in the lining plate 80 and the suspension 24, and contacts the copper foil 82 through an under filler 89 made of material such as silicon grease or the like that has a high thermal conductivity.

In this structure, heat generated from the head IC can be radiated more efficiently by the heat radiation plate 88, so that temperature increase of the head IC exceeding a guaranteed temperature range, characteristic changes of the magnetic head 26 due to heat from the head IC 50, and deterioration of mechanical characteristics of the suspension 24 can be prevented.

Figure 10:
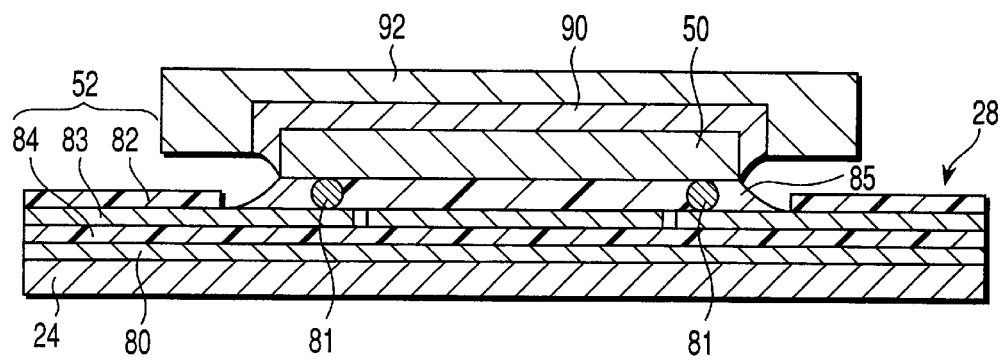
FIG. 10 is a cross-sectional view showing a head IC part of a HSA according to the fifth embodiment of the present invention.

According to a fifth embodiment of the present invention shown in FIG. 10, in place of providing an opening in the lining plate 80 and the suspension 24, a heat radiation plate 92 is attached to the upper and side surfaces of the head IC 50 through filler 90 made of, for example, silicon grease.

Also, in the fifth embodiment thus constructed, heat generated from the head IC can be radiated more efficiently through the heat radiation plate 92, so that temperature increase of the head IC exceeding a guaranteed temperature range, characteristic changes of the magnetic head 26 due to heat from the head IC 50, and deterioration of mechanical characteristics of the suspension 24 can be prevented. In addition, dust and fragments sticking to the wafer of the head IC can be prevented from falling down on the magnetic disks, by covering the entire surface of the head IC 50 with the heat radiation plate 92, the under filler 85, and the filler 90.

Figure 11:
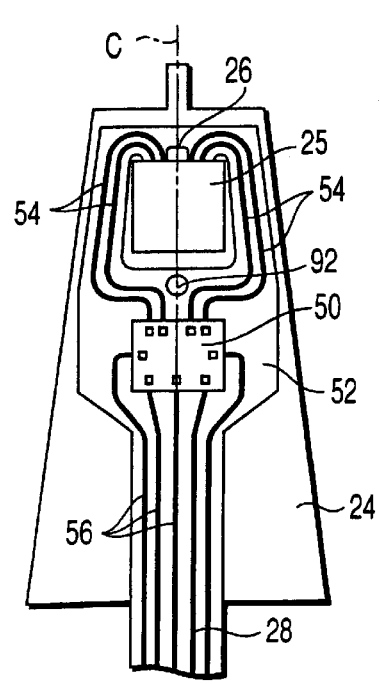
FIG. 11 is a plan view showing a HSA according to the sixth embodiment of the present invention.

According to a sixth embodiment of the present invention shown in FIG. 11, the lining plate of the trace 28 and the suspension 24 are welded to each other at a welding point 92 positioned on the center axis C of the suspension 24, between the slider 25 and the head IC 50.

In this structure, heat generated from the head IC 50 can be transmitted to the suspension 24 through the welding point 92, so that heat radiation effect can be strengthened. In addition, even if the lining plate near the head IC is thermally expanded by heat from the head IC 50, parts that support the slider 25 is fixed by the welding point 92, so that deterioration of mechanical characteristics of the suspension 24 can be prevented.

Figure 12:
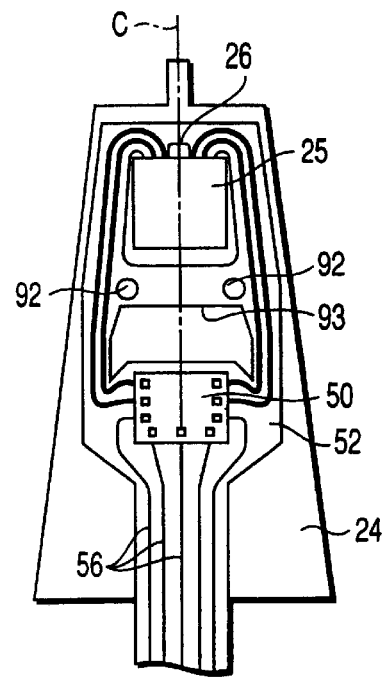
FIG. 12 is a plan view showing a HSA according to the seventh embodiment of the present invention.

Further, according to a seventh embodiment of the present invention shown in FIG. 12, the lining plate of the trace 28 and the suspension 24 are welded to each other at two welding points 92 located between the slider 25 and the head IC 50. These welding points 92 are arranged symmetrically with respect to the center axis C. In addition, a part of the lining plate of the trace 28 is removed between the slider 25 and the head IC 50, thereby to form an opening 93. This opening 93 is formed symmetrically with respect to the center axis C.

In the structure described above, the same operation and effect as in the sixth embodiments can be obtained by providing the welding points 92, and heat of the head IC 50 can be hindered from being transmitted to parts that support the slider 25. Thus, deterioration of mechanical characteristics can be securely prevented.

Figure 13:
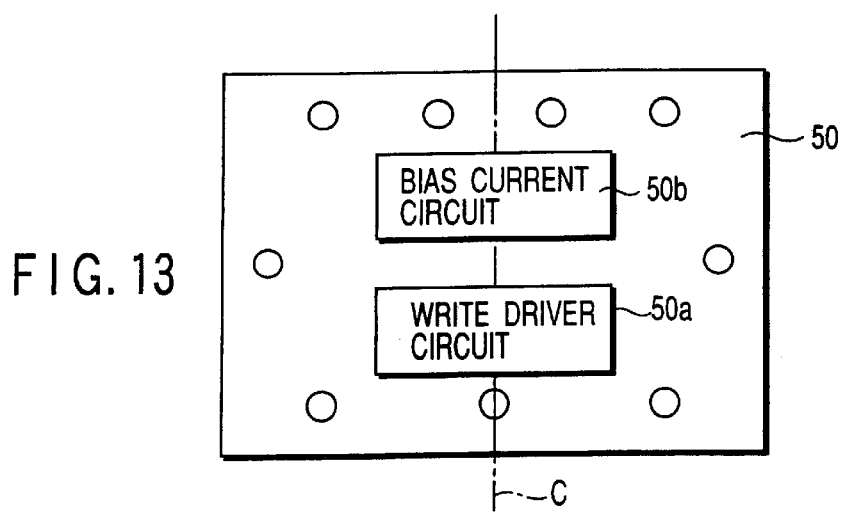
FIG. 13 is a plan view schematically showing a head IC in a HSA according to the eighth embodiment of the present invention.

Meanwhile, as shown in FIG. 13, the circuit that generates heat of the highest calorie among circuits of the head IC 50 is the write driver circuit 50a, and the circuit that generates heat of the next highest calorie is a bias current circuit 50b. Further, as the lining plate and the suspension 24 are thermally expanded by heat from these circuits 50a and 50b, the balance of the suspension is degraded so that the mechanical characteristics are deteriorated.

Hence, in an eighth embodiment of the present invention shown in FIG. 13, the write driver circuit 50a and the bias current circuit 50b of the head IC are each formed symmetrically with respect to the center axis C of the suspension 24. In this manner, thermal expansions of the lining plate and the suspension 24 become symmetrical with respect to the center axis C, so that the suspension 24 is well balanced. Accordingly, deterioration of mechanical characteristics can be prevented.

Figure 14:
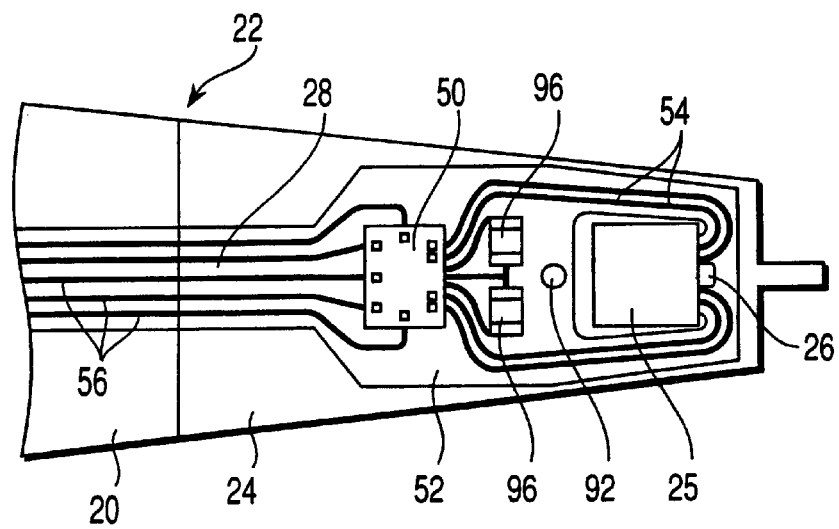
FIG. 14 is a plan view showing a HSA according to the ninth embodiment of the present invention.
Figure 15:
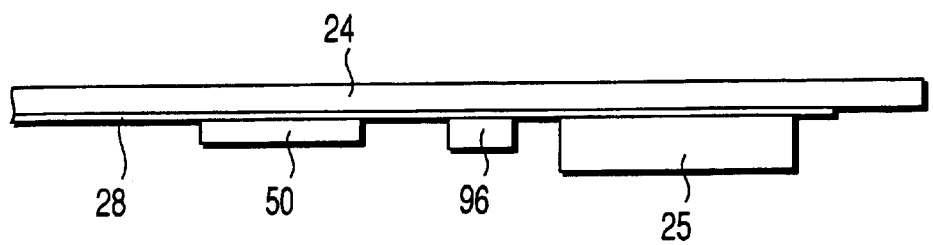
FIG. 15 is a side view of a HSA according to the ninth embodiment.

According to a ninth embodiment of the present invention shown in FIGS. 14 and 15, two capacitors 96 are mounted on the trace 28 of each HSA 22. The heights of the slider 25, the capacitor 96, and the head IC 50 decrease in this order. Further, according to the present embodiment, the slider 25 is positioned at the distal end of the suspension 24, and the capacitors 96 are mounted on the trace 28 between the slider and the head IC 50, and is connected to the head IC.

In the structure as described above, the height margins of the head IC 50 and the capacitors 96 can be set wide with respect to the magnetic disks. Accordingly, the head IC 50 and the capacitors 96 are prevented from coinciding with the surfaces of the magnetic disks and from being damaged thereby, even if the HSA 22 is deformed due to an external impact or the like.

In the second to ninth embodiments described above, the other points of the structures than those described above are the same as those in the first embodiment. Therefore, the same parts as those in the first embodiment are denoted at common reference numerals, and detailed explanation thereof will be omitted herefrom.

Further, each of the above mentioned embodiments may be combined with other one or more embodiments.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A magnetic disk apparatus comprising:

a magnetic disk;

a plurality of magnetic heads for recoding/reproducing of information with respect to the magnetic disk;

a carriage assembly supporting the magnetic heads movably with respect to the magnetic disk, the carriage assembly including a bearing unit, and a plurality of head suspension assemblies each of which has a proximal end portion supported by the bearing unit and a distal end portion on which one of the magnetic heads is mounted; and a main flexible printed circuit board having a connection end portion attached to the carriage assembly, and a proximal end portion positioned apart from the connection end portion, wherein each of the head suspension assemblies includes an arm extending from the bearing unit, a suspension projecting from an extended end of the arm, an elongate relay flexible printed circuit board provided on the arm and the suspension and having a distal end portion electrically connected to the magnetic head and a proximal end portion connected to the connection end portion of the main flexible printed circuit board, and a head IC mounted on the relay flexible printed circuit board near the magnetic head, the relay flexible printed circuit board includes a signal line, a power source line, and a ground line extending from the magnetic head to the proximal end portion through the head IC, the main flexible printed circuit board includes a plurality of sets of connection pads, in correspondence with the plurality of head suspension assemblies, the connection pads of each set includes first, second and third connection pads respectively connected with the signal line, power source line and ground line of the relay flexible printed circuit board, and the main flexible printed circuit board includes a connection line which connects the plurality of third pads with each other, a ground line extending from one of the third connection pads to the proximal end portion, and a plurality of signal lines extending respectively from the first and second connection pads to the proximal end portion.

2. The magnetic disk apparatus according to claim 1, wherein the relay flexible printed circuit board of each of the head suspension assemblies includes a signal electrode pad, a power source electrode pad, and a ground electrode pad which are provided at the proximal end portion and connected respectively with the signal line, the power source line, and the ground line of the relay flexible printed circuit board, the ground electrode pad and the power source electrode pad are provided closer to a side of the magnetic head than the signal electrode pad, the second and third connection pads of the main flexible printed circuit board are provided closer to the distal end side of the connection end portion than the first connection pad, and the signal electrode pad, the power source electrode pad, and the ground electrode pad of the relay flexible printed circuit board are soldered respectively to the first, second, and third connection pads of the main flexible printed circuit board.

3. The apparatus according to claim 1, wherein the main flexible printed circuit board includes a connection line which connects the plurality of second connection pads with each other, and a power source line extending from one of the second connection pads to the proximal end portion.

4. A magnetic disk apparatus comprising:

a magnetic disk;

a plurality of magnetic heads for recoding/reproducing of information with respect to the magnetic disk;

a carriage assembly supporting the magnetic heads movably with respect to the magnetic disk, the carriage assembly including a bearing unit, and a plurality of head suspension assemblies each of which has a proximal end portion supported by the bearing unit and a distal end portion on which one of the magnetic heads is mounted; and a main flexible printed circuit board having a connection end portion attached to the carriage assembly, and a proximal end portion positioned apart from the connection end portion, wherein each of the head suspension assemblies includes an arm extending from the bearing unit, a suspension projecting from an extended end of the arm, an elongate relay flexible printed circuit board provided on the arm and the suspension and having a distal end portion electrically connected to the magnetic head and a proximal end portion connected to the connection end portion of the main flexible printed circuit board, and a head IC mounted on the relay flexible printed circuit board near the magnetic head, the relay flexible printed circuit board includes a signal line and a power source line extending from the magnetic head to the proximal end portion through the head IC, and a ground line extending from the head IC and connected with the suspension, and the main flexible printed circuit board includes a common ground line extending from the proximal end portion to the connection end portion and connected to the head IC through the arm, suspension, and ground line of each of the head suspension assemblies.

5. The magnetic disk apparatus according to claim 4, wherein the main flexible printed circuit board has a through hole formed in the connection end portion, and a conductive portion extending around the through hole and electrically connected with the arm of each of the head suspension assemblies by a screw, which is screwed in the bearing unit through the through hole and has a conductivity.

* * * * *